United States Patent
Cho et al.

(10) Patent No.: US 11,109,158 B2
(45) Date of Patent: Aug. 31, 2021

(54) AUDIO ADJUSTMENT METHOD AND ASSOCIATED AUDIO ADJUSTMENT CIRCUIT FOR ACTIVE NOISE CANCELLATION

(71) Applicant: Realtek Semiconductor Corp., HsinChu (TW)

(72) Inventors: Chun-Ming Cho, Hsinchu (TW); Wei-Hung He, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 50 days.

(21) Appl. No.: 16/828,992

(22) Filed: Mar. 25, 2020

(65) Prior Publication Data

US 2020/0336833 A1  Oct. 22, 2020

(30) Foreign Application Priority Data

Apr. 18, 2019  (TW) ................. 108113508

(51) Int. Cl.
*H04R 5/04* (2006.01)
*H04R 5/033* (2006.01)
(Continued)

(52) U.S. Cl.
CPC ............ *H04R 5/04* (2013.01); *H04L 5/0007* (2013.01); *H04L 27/265* (2013.01); *H04R 3/04* (2013.01); *H04R 5/033* (2013.01); *H04R 2460/01* (2013.01)

(58) Field of Classification Search
CPC ...... H04R 5/033; H04R 5/04; H04R 2460/01; H04R 3/04; H04L 27/265; H04L 5/0007
(Continued)

(56) References Cited

U.S. PATENT DOCUMENTS

2011/0293103 A1* 12/2011 Park ................. G10K 11/17827
  381/57
2014/0243048 A1  8/2014 Kwan

FOREIGN PATENT DOCUMENTS

CN  101867355 B  9/2014
CN  107371079 A  11/2017
(Continued)

OTHER PUBLICATIONS

Office action dated Mar. 24, 2021 for CN application No. 201910340389.7, filing date: Apr. 25, 2019, pp. 1-7.
(Continued)

*Primary Examiner* — Paul Kim
(74) *Attorney, Agent, or Firm* — Winston Hsu

(57) ABSTRACT

An active noise cancellation (ANC) circuit includes: an audio generating circuit; an audio input unit for transmitting an audio to be broadcast or a sound testing signal as a first time domain signal; an audio receiver for receiving a background sound as a second time domain signal, wherein the background sound corresponds to the audio to be broadcasted or the sound testing signal; and a channel estimation unit, configured to receive the first time domain signal and the second time domain signal, perform time-frequency conversion upon the first time domain signal and the second time domain signal to obtain a first frequency domain signal and a second frequency domain signal respectively, and generate a frequency response according to the first frequency domain signal and the second frequency domain signal. The frequency response is for adjusting an active noise cancelling coefficient of the ANC circuit to improve a noise cancellation effect.

16 Claims, 3 Drawing Sheets

(51) Int. Cl.
*H04L 5/00* (2006.01)
*H04L 27/26* (2006.01)
*H04R 3/04* (2006.01)

(58) Field of Classification Search
USPC .......................................................... 381/309
See application file for complete search history.

(56) References Cited

FOREIGN PATENT DOCUMENTS

| | | |
|---|---|---|
| CN | 107734412 A | 2/2018 |
| CN | 107945784 A | 4/2018 |

OTHER PUBLICATIONS

Sen M. Kuo, Dennis R. Morgan, "Active Noise Control: A Tutorial Review", IEEE, USA, Jun. 1999 pp. 943-973.
Sakshi Gaur, V. K. Gupta, "A Review on Filtered-X LMS Algorithm", IJSPS, Apr. 2016 pp. 172-176.
Pooja Gupta, Manoj Kumar Sharma, Ravi Pal, "Different Techniques of Secondary Path Modeling for Active Noise Control System: A Review", IJERT, Jun. 2016 pp. 611-616.

\* cited by examiner

AUDIO ADJUSTMENT METHOD AND ASSOCIATED AUDIO ADJUSTMENT CIRCUIT FOR ACTIVE NOISE CANCELLATION

BACKGROUND OF THE INVENTION

1. Field of the Invention

The present invention is related to audio adjustment methods and associated circuits, and more particularly, to a method and an associated circuit for improving a noise cancellation effect of an active noise cancellation (ANC) earphone.

2. Description of the Prior Art

When listening to music with earphone(s)/headphone, a noise cancellation function is extremely important. Passive noise cancellation can utilize material(s) or a structure of the earphone to slightly reduce the volume of noise being transmitted to the ears. For specific types of sounds, particularly unpleasant sounds, however, the improvement is not significant. In comparison with passive noise cancellation, active noise cancellation (ANC) provides extra noise cancellation effect. ANC has therefore become popular for earphone products.

The first issue in the development of ANC earphone products is that accurate adjustment for the specific level of noise cancellation is required. Responses caused due to the earphone mechanism, components, and materials of earplugs/earmuffs with respect to background noise (e.g. environmental noise) are often referred to as a primary path response. Only considering the primary path response is insufficient, however, as a secondary path response and a feedback path neutralization (FBPN) response are significant factors which worsening the ANC effect.

Solution(s) for the secondary path response need to utilize a least mean square (LMS) algorithm for convergence. These methods may inevitably encounter a tradeoff in convergence speed, convergence stability, and accuracy after convergence.

As mentioned above, there is a need for a novel method to solve the aforementioned problems, for enhancing the noise cancellation effect of the ANC earphone.

SUMMARY OF THE INVENTION

In light of the above problems, the present invention provides an audio processing method, which can quickly and accurately estimate the secondary path response and the feedback path neutralization (FBPN). The method can be easily applied to finite impulse response (FIR) or infinite impulse response (IIR) filter architectures. The present invention can solve the problems of the related art without introducing any side effect or in a way that is less likely to introduce side effects.

One embodiment of the present invention provides an active noise cancellation (ANC) circuit, which is applicable to an electronic device. The ANC circuit comprises an audio generating circuit, an audio input unit, an audio receiver and a channel estimation unit. The audio input unit is configured to transmit audio to be broadcast or a sound testing signal as a first time domain signal. The audio receiver is configured to receive a background sound as a second time domain signal, wherein the background sound corresponds to the audio to be broadcast or the sound testing signal. The channel estimation unit is configured to receive the first time domain signal and the second time domain signal, perform time-frequency conversion upon the first time domain signal and second time domain signal to obtain a first frequency domain signal and a second frequency domain signal respectively, and generate a frequency response according to the first frequency domain signal and the second frequency domain signal. The frequency response is configured to adjust an active noise cancelling coefficient of the ANC circuit to improve a noise cancellation effect.

One embodiment of the present invention provides an ANC adjustment method, which is applicable to an ANC circuit. The ANC circuit comprises an audio receiver and an audio generating circuit, and the audio receiver is configured to receive sounds. The ANC adjustment method comprises: generating a first time domain signal according to audio to be broadcast or a sound testing signal; generating a second time domain signal according to a background sound received by the audio receiver, wherein the background sound corresponds to the audio to be broadcast or the sound testing signal; performing time-frequency conversion upon the first time domain signal and second time domain signal to obtain a first frequency domain signal and a second frequency domain signal respectively; generating a frequency response according to the first frequency domain signal and the second frequency domain signal; and adjusting an active noise cancelling coefficient of the ANC circuit according to the frequency response to improve a noise cancellation effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
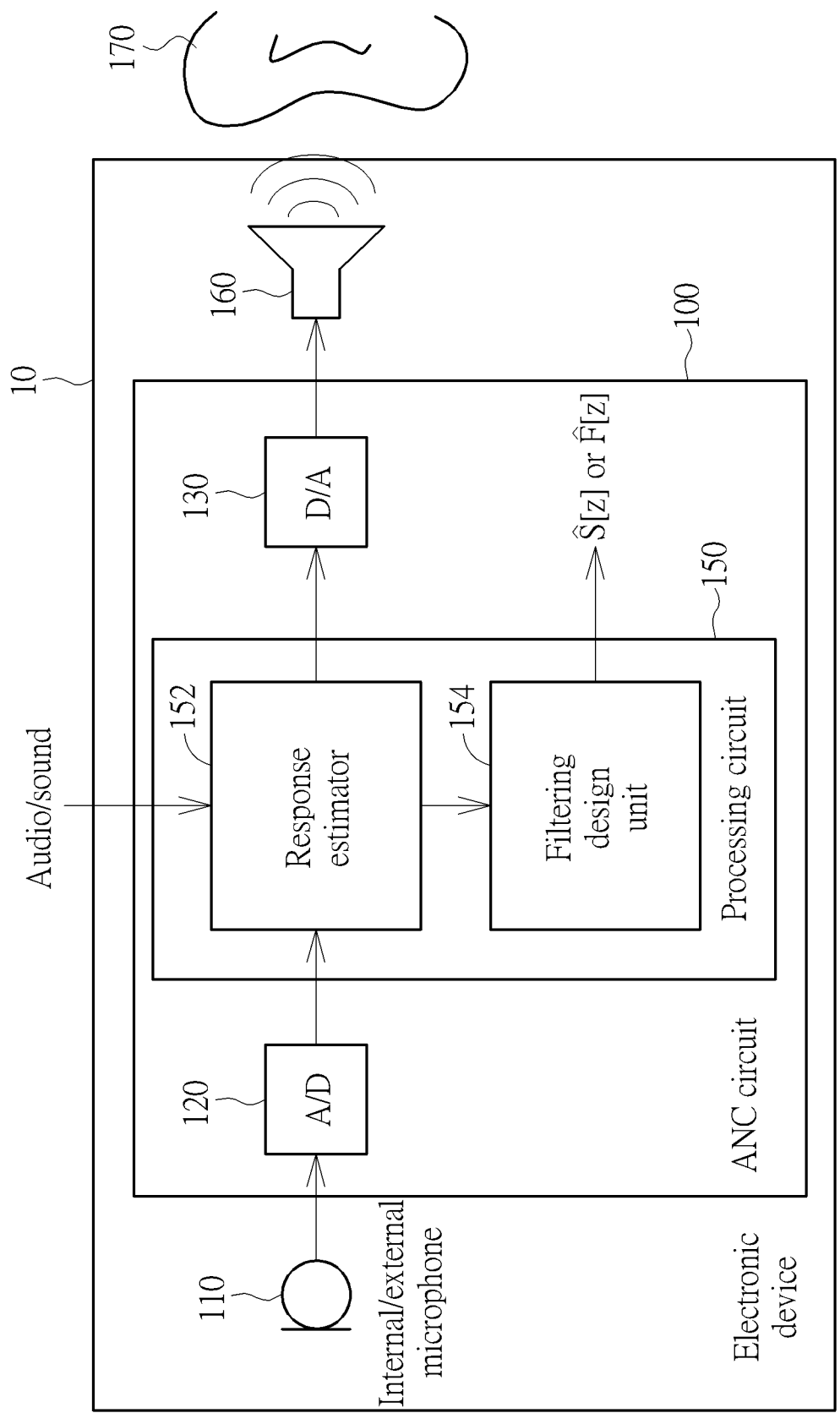
FIG. 1 is an architecture diagram illustrating calculation of a filtering coefficient of an earphone according to an embodiment of the present invention.

Refer to FIG. 1, which is an architecture diagram illustrating calculation of a filtering coefficient of an active noise cancellation (ANC) circuit 100 according to an embodiment of the present invention. The ANC circuit 100 is applicable to an electronic device 10, which may be designed as an earphone/headphone object, or may be designed as a portion or all of an audio system. As shown in FIG. 1, the electronic device 10 comprises an internal/external microphone 110 (referred to as the microphone 110 for brevity) and speaker 160, where both of them are coupled to the ANC circuit 100. The ANC circuit 100 may comprise an analog-to-digital converter (ADC) 120 (labeled "A/D" in figures), a digital-to-analog converter (DAC) 130 (labeled "D/A" in figures) and a processing circuit 150. The internal/external microphone 110 may be an external microphone positioned on a surface of the electronic device 10, or an internal microphone built into the electronic device 10. In an embodiment, the internal/external microphone 110 may be an internal/external microphone with digital form, and digital audio signals may be directly output without using the ADC 120. The ADC 120 is configured to convert analog audio signals recorded by the internal/external microphone 110 into digital signals, and transmit them to the processing circuit 150 for processing. Afterwards, the processing circuit 150 transmits the processed digital signals to the DAC 130, and the DAC 130 may accordingly generate analog sounds to be broadcast by the speaker 160 and received by a human ear 170. In another embodiment, the ANC circuit 100 is a digital circuit, and the ADC 120 and the DAC 130 are included in the electronic device 10 or other circuits.

In general, a secondary path response or a feedback path neutralization (FBPN) response has to be estimated during normal wearing of an earphone/headphone (referred to as the earphone for brevity). In addition to this method of estimation, the scenario of a listening user may be imitated using an artificial head (or an artificial ear) device, i.e. the human ear 170 is replaced with an artificial ear. In addition, it is preferable to perform estimation in an anechoic chamber or an environment with proper sound isolation, where the effect of estimating the FBPN response can be better.

The processing circuit 150 comprises a response estimator (e.g. a response estimator unit) 152 and a filtering design unit 154. The response estimator 152 is configured to capture a time domain signal to be broadcast (i.e. an audio signal to be output from the DAC 130) and a time domain signal received by the microphone 110 (i.e. a background sound or an environmental sound recorded by the microphone 110), and perform response estimation upon both of them to thereby generate a vector of frequency response, which represents a response of some specific frequency points in the frequency domain. Afterwards, the filtering design unit 154 performs filtering fitting to generate a filtering coefficient (when the microphone is the internal microphone, the estimated filtering coefficient is represented by $\hat{S}[z]$; or, when the microphone is the external microphone, the estimated filtering coefficient is represented by $\hat{F}[z]$). The generated filtering coefficient may be configured to perform further adjustment upon the generation of anti-noise by the ANC circuit 100, to make the generated anti-noise have more accurate amplitude and phase. As a result, the ANC circuit 100 may provide a better cancellation effect regarding noise; more particularly, regarding the portion of the secondary path response and the FBPN response, the generated filtering coefficient ($\hat{S}[z]$ or $\hat{F}[z]$) may be active noise cancelling coefficient after adjustment for further use by the ANC circuit 100.

An asynchronization phenomenon between the receiving of microphone and the broadcasting of earphone causes the secondary path response and the FBPN response which are need to be estimated. A response may comprise a component on phase (e.g. the length of the delay between the signal being broadcast by the earphone and received by the microphone) and a component on energy/power (e.g. variation of a gain), where the response needs to be accurately estimated in order to obtain an accurate inverted cancellation waveform. For example, using the internal microphone to imitate a real ear, and assuming that a response of an external sound to the internal microphone is P[z] and a response of the earphone speaker to the internal microphone is a secondary path response S[z], ideally, a feedforward ANC filter needs to approach −P[z]/S[z] as close as possible, and the inverted cancellation waveform may be incorrect if estimation of S[z] is not accurate.

Figure 2:
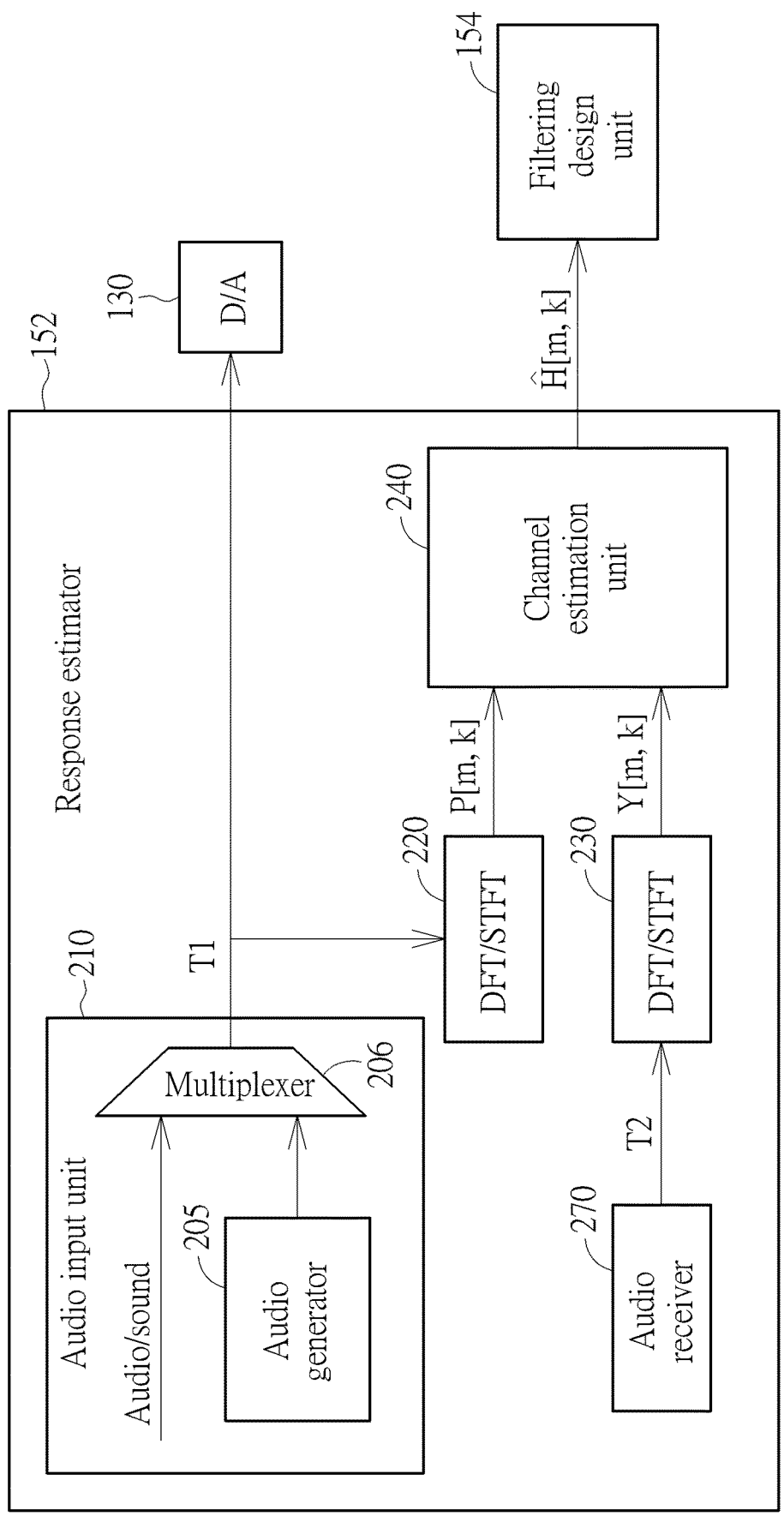
FIG. 2 is a block diagram illustrating detailed operations of an response estimator.

Further refer to FIG. 2, which is a block diagram illustrating detailed operations of the response estimator 152. As shown in FIG. 2, an audio input unit 210 comprises a multiplexer 206, where the multiplexer 206 may select an audio/sound to be broadcast or output a signal (which may be a sound testing signal for performing noise cancellation adjustment of the present invention) generated by an audio generating circuit such as an audio generator 205, then provide a conversion unit 220 with a time domain signal T1 to perform a discrete Fourier transform (DFT) or short-time Fourier transform (STFT), and accordingly generate a converted frequency domain signal P[m,k] for a channel estimation unit 240. In addition, a background sound (e.g. a time domain signal T2) received by the audio receiver 270 (coupled to the internal/external microphone 110 within the electronic device 10) may be transmitted to a conversion unit 230 for DFT/STFT processing, and accordingly generate a converted frequency domain signal Y[m,k] for the channel estimation unit 240, where the time domain signal T1 and the time domain signal T2 are two time domain signals generated at a same time. Note that, although the conversion units 220 and 230 are described as two independent components in the above examples, the conversion units 220 and 230 may be integrated as a same component in the present invention. Finally, the channel estimation unit 240 performs channel estimation upon the received frequency domain signal P[m,k] and Y[m,k]. The channel estimation unit 240 is an orthogonal frequency-division multiplexing (OFDM) channel estimation unit, and more particularly, may be a pilot-aided OFDM channel estimation unit.

When performing noise cancelling coefficient adjustment, in addition to utilizing the sound testing signal generated by the audio generator as a sample, the audio/sound to be broadcast may also be utilized as a sample, where the sound testing signal may be a single tone sound or a multiple tones sound. After being converted to the frequency domain by the conversion unit 220, the converted sample and the input signal from the audio receiver 270 (e.g. from the internal/external microphone 110 within the electronic device 10) may undergo OFDM channel estimation together to generate a frequency response. Afterwards, the generated frequency response may be transmitted to the filtering design unit 154, and the filtering design unit 154 may generate a filtering coefficient to improve operations of noise cancellation. As OFDM is well known in the related art, associated details are omitted here for brevity.

In detail, the audio to be broadcast and the sound testing signal may comprise various features located in different frequency intervals. For example, the features may comprise: a first feature within 0 to 200 Hz, a second feature within 200 Hz to 500 Hz and a third feature beyond 500 Hz, where the first feature may be 100 Hz, the second feature may be 300 Hz, and the third feature may be 500 Hz, but the present invention is not limited thereto.

The main objective of the aforementioned converting the time domain signals T1 and T2 into the frequency domain signals P[m,k] and Y[m,k] is to estimate responses, wherein, m is an index of time, and k is an index of frequency. Calculation in the frequency domain is easier than in the time domain, because a convolution operation in the time domain becomes simple multiplication operations after converting to the frequency domain. When performing OFDM operations, a frequency with stronger energy may be selected from respective time points to be a pilot tone of an OFDM system. Then, in a condition where the pilot tone and the frequency domain signals P[m,k] and Y[m,k] have been obtained, the pilot-aided OFDM channel estimation (which is well known in this art) may be utilized as shown in the following equation, where $\hat{H}[m,k]$ is a frequency response to be output.

$$\hat{H}[m,k]=Y[m,k]/P[m,k]$$

It should be noted that the magnitude of P[m,k] must be large enough (i.e., greater than a threshold). In general, Y[m,k]=P[m,k]*$\hat{H}$[m,k]+N[m,k], wherein N[m,k] represents the noise received on Y[m,k] (such as noise floor of microphone). That is, Y[m,k]/P[m,k]=$\hat{H}$[m,k]+N[m,k]/P[m,k]. If P[m,k] is not large enough, then (N[m,k]/P[m,k]) cannot be ignored, and (Y[m,k]/P[m,k]) is not close to $\hat{H}$[m,k]. In addition, the present invention is not limited to calculate the frequency response via the channel estimation unit 240 after the response estimator 152 obtains the frequency domain signals P[m,k] and Y[m,k]. Using other methods instead of above mentioned channel estimation to calculate frequency response between frequency domain signals P[m,k] and Y[m,k] also falls within the scope of the present invention.

The present invention is not limited to filtering fitting, and other methods such as the invfreqz function in MATLAB may be used. In practice, the filter of the present invention may adopt a finite impulse response (FIR) filter or an infinite impulse response (IIR) filter.

The aforementioned method of the present invention can be widely used in many applications, at least comprising the following scenarios:
(1) the aforementioned method is applicable to real time calculations when the user is using an ANC earphone, and the user can adjust the noise cancelling coefficient of the ANC earphone according to a current environment;
(2) The aforementioned method may be performed when the ANC earphone is powered on, and complete calculation in an initial power on adjustment phase; and
(3) the aforementioned method may be utilized to determine a default noise cancelling coefficient when being delivered from a manufacturer. In comparison with the present invention, the related art needs high precision instrument(s) to measure the secondary path response and the FBPN response in order to determine the default noise cancelling coefficient with enough accuracy, and therefore hardware costs are greatly increased.

It should be noted that the aforementioned three scenarios may be arranged in groups. For example, the user may merely rely on self-adjustment when the ANC earphone is powered on, and use the adjusted result afterwards. In another example, the user may trigger adjustment of the product themselves after the product has been used for a while.

In addition, the method, circuit and device of the present invention are not limited to earphone noise cancellation. For example, an earphone device comprising the ANC circuit 100 may be implemented by a domestic audio system or an automobile audio system, and the associated method may be configured to perform indoor/in-automobile noise cancellation because the domestic audio system or the automobile audio system may broadcast an audio inverted noise to achieve the noise cancellation effect. In comparison with the present invention, if indoor or in-automobile noise cancellation is needed, the related art must further develop instruments for measuring the secondary path response and the FBPN response regarding different indoor spaces or automobiles respectively.

Figure 3:
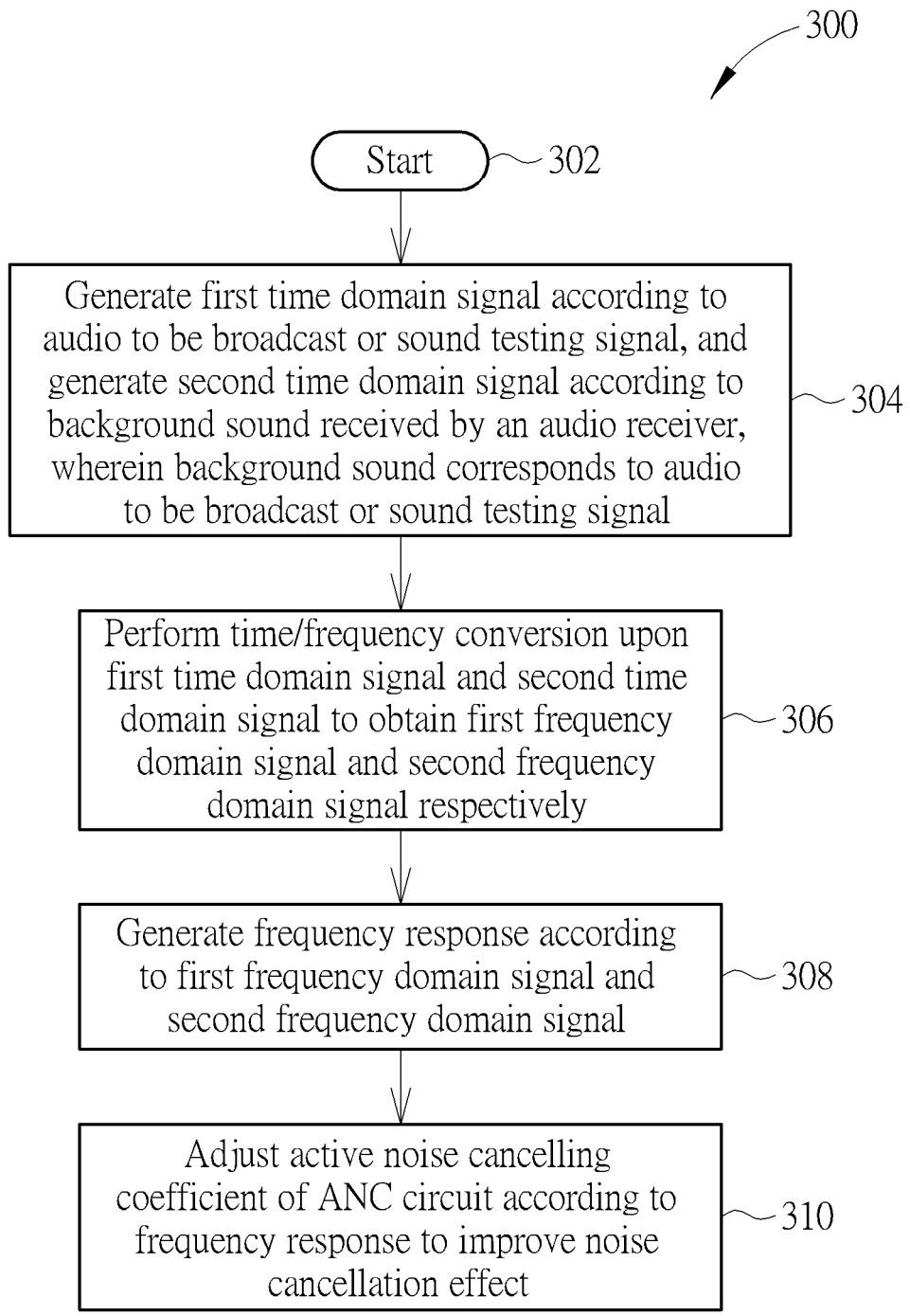
FIG. 3 is a flowchart illustrating an ANC adjustment method according to an embodiment of the present invention.

Refer to FIG. 3, which is a flowchart illustrating an ANC adjustment method 300 according to an embodiment of the present invention. Note that the steps shown in FIG. 3 do not have to be executed by the order shown in FIG. 3 if the same result may be obtained. The method shown in FIG. 3 may be adopted by the ANC circuit 100 of the electronic device 10 shown in FIG. 1 and the aforementioned audio systems, and the method may be briefly summarized as follows:

Step 302: start;
Step 304: generate a first time domain signal according to an audio to be broadcast or a sound testing signal, and generate a second time domain signal according to a background sound (or an environmental sound) received by an audio receiver, wherein the background sound corresponds to the audio to be broadcast or the sound testing signal (e.g. noise received by the microphone should be synchronous with the audio to be broadcasted in ideal conditions, but the phase of the noise is slightly in the lead compared with the audio to be broadcast);
Step 306: perform time-frequency conversion upon the first time domain signal and second time domain signal to obtain a first frequency domain signal and a second frequency domain signal respectively;
Step 308: generate a frequency response according to the first frequency domain signal and the second frequency domain signal; and
Step 310: adjust an active noise cancelling coefficient of an ANC circuit (e.g. the ANC circuit 100) according to the frequency response to improve a noise cancellation effect.

The first time domain signal and the second time domain signal are two sets of data captured at a same time. To summarize, the present invention can effectively solve the problems of the related art where the ANC technique cannot properly solve the problems of the secondary path response and the FBPN response. Moreover, adopting the method of the present invention does not need expensive adjustment instrument, so the present invention can achieve great performance without increasing costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An active noise cancellation (ANC) circuit, applicable to an electronic device, the ANC circuit comprising:
an audio input unit, configured to transmit an audio to be broadcast or a sound testing signal as a first time domain signal;
an audio receiver, configured to receive a background sound as a second time domain signal, wherein the background sound corresponds to the audio to be broadcast or the sound testing signal; and
a channel estimation unit, configured to receive the first time domain signal and the second time domain signal, perform time-frequency conversion upon the first time domain signal and second time domain signal to obtain a first frequency domain signal and a second frequency domain signal respectively, and generate a frequency response according to the first frequency domain signal and the second frequency domain signal;

wherein the frequency response is configured to adjust an active noise cancelling coefficient of the ANC circuit to improve a noise cancellation effect, the frequency response is transmitted to a filtering design unit, the filtering design unit generates a filtering coefficient to improve the active noise cancelling coefficient according to the frequency response, the filtering design unit is configured to generate an adjusted active noise cancelling coefficient according to the filtering coefficient, and feed the adjusted active noise cancelling coefficient back to the audio to be broadcast or the sound testing signal for calculating a difference between a phase of the first time domain signal and a phase of the second time domain signal.

2. The ANC circuit of claim 1, wherein the first time domain signal and the second time domain signal are two time domain signals at a same time.

3. The ANC circuit of claim 1, wherein the audio to be broadcast and the sound testing signal comprises:
a first feature within 0 to 200 Hz;
a second feature within 200 Hz to 500 Hz; and
a third feature beyond 500 Hz.

4. The ANC circuit of claim 1, further comprising:
a multiplexer, configured to select one of the audio to be broadcast and the sound testing signal to be the first time domain signal.

5. The ANC circuit of claim 1, further comprising:
a conversion unit, configured to perform a discrete Fourier transform (DFT) or a short-time Fourier transform (STFT) upon the first time domain signal and the second time domain signal to obtain the first frequency domain signal and the second frequency domain signal respectively.

6. The ANC circuit of claim 5, wherein the channel estimation unit performs orthogonal frequency-division multiplexing (OFDM) channel estimation according to the first frequency domain signal and the second frequency domain signal to generate the frequency response.

7. The ANC circuit of claim 6, wherein the channel estimation unit is a pilot-aided OFDM channel estimation unit.

8. The ANC circuit of claim 1, wherein the electronic device comprises a speaker, wherein the frequency response is configured to adjust the active noise cancelling coefficient of the ANC circuit to reduce at least one of impact of background noise, secondary path response or feedback path neutralization (FBPN) on an audio broadcast by the speaker.

9. The ANC circuit of claim 1, wherein the electronic device is implemented as an earphone or audio system.

10. An active noise cancellation (ANC) adjustment method, applicable to an ANC circuit, the ANC circuit comprising an audio receiver and an audio input unit, the audio receiver being configured to receive sounds, the ANC adjustment method comprising:
generating a first time domain signal according to an audio to be broadcast or a sound testing signal by the audio input unit;
generating a second time domain signal according to a background sound received by the audio receiver, wherein the background sound corresponds to the audio to be broadcast or the sound testing signal;
performing time-frequency conversion upon the first time domain signal and second time domain signal to obtain a first frequency domain signal and a second frequency domain signal respectively;
generating a frequency response according to the first frequency domain signal and the second frequency domain signal; and
adjusting an active noise cancelling coefficient of the ANC circuit according to the frequency response to improve a noise cancellation effect;
wherein the frequency response is transmitted to a filtering design unit, the filtering design unit generates a filtering coefficient to improve the active noise cancelling coefficient according to the frequency response, and
the step of adjusting the active noise cancelling coefficient of the ANC circuit according to the frequency response to improve the noise cancellation effect comprises:
generating an adjusted active noise cancelling coefficient according to the filtering coefficient, and feeding the adjusted active noise cancelling coefficient back to the audio to be broadcast or the sound testing signal for calculating a difference between a phase of the first time domain signal and a phase of the second time domain signal.

11. The ANC adjustment method of claim 10, wherein the first time domain signal and the second time domain signal are two time domain signals at a same time.

12. The ANC adjustment method of claim 10, wherein the audio to be broadcast and the sound testing signal comprises:
a first feature within 0 to 200 Hz;
a second feature within 200 Hz to 500 Hz; and
a third feature beyond 500 Hz.

13. The ANC adjustment method of claim 10, wherein the step of performing the time-frequency conversion upon the first time domain signal and second time domain signal to obtain the first frequency domain signal and the second frequency domain signal respectively comprises:
performing a discrete Fourier transform (DFT) or a short-time Fourier transform (STFT) upon the first time domain signal and the second time domain signal to obtain the first frequency domain signal and the second frequency domain signal respectively.

14. The ANC adjustment method of claim 13, wherein the step of generating the frequency response according to the first frequency domain signal and the second frequency domain signal comprises:
performing orthogonal frequency-division multiplexing (OFDM) channel estimation according to the first frequency domain signal and the second frequency domain signal to generate the frequency response.

15. The ANC adjustment method of claim 14, wherein the channel estimation is a pilot-aided OFDM channel estimation.

16. The ANC adjustment method of claim 10, wherein the ANC circuit is coupled to a speaker, and the step of adjusting the active noise cancelling coefficient of the ANC circuit according to the frequency response to improve the noise cancellation effect comprises:
adjusting the active noise cancelling coefficient of the ANC circuit to reduce at least one of impact of background noise, secondary path response or feedback path neutralization (FBPN) on an audio broadcast by the speaker.

* * * * *